United States Patent
Kawahara et al.

(10) Patent No.: US 6,864,011 B2
(45) Date of Patent: Mar. 8, 2005

(54) FUEL-CELL ELECTRODE AND METHOD OF MANUFACTURING THE FUEL-CELL ELECTRODE

(75) Inventors: Tatsuya Kawahara, Toyota (JP); Seiji Mizuno, Toyota (JP); Takahiko Asaoka, Aichi-gun (JP); Yu Morimoto, Aichi-gun (JP); Kazuo Kawahara, Aichi-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 141 days.

(21) Appl. No.: 10/242,409

(22) Filed: Sep. 13, 2002

(65) Prior Publication Data

US 2003/0047461 A1 Mar. 13, 2003

Related U.S. Application Data

(62) Division of application No. 09/670,014, filed on Sep. 26, 2000, now abandoned.

(30) Foreign Application Priority Data

Oct. 20, 1999 (JP) ............................................ 11-297992

(51) Int. Cl.$^7$ .............................. C25D 3/50; C25D 3/56; H01M 4/86; H01M 4/90; H01M 4/96
(52) U.S. Cl. ......................... 429/42; 205/264; 205/257; 429/44
(58) Field of Search ..................... 429/42, 44; 205/264, 205/257

(56) References Cited

U.S. PATENT DOCUMENTS

| 5,350,643 A | * | 9/1994 | Imahashi et al. | ............. 429/33 |
| 6,080,504 A | * | 6/2000 | Taylor et al. | ................. 429/42 |

FOREIGN PATENT DOCUMENTS

| DE | 198 37 669 A1 | 3/2000 |
| DE | 100 47 935 A1 | 7/2001 |

OTHER PUBLICATIONS

E. J. Taylor et al., "Preparation of High–Platinum–Utilization Gas Diffusion Electrodes for Proton–Exchange–Membrane Fuel Cells", *J. Electrochem. Soc.*, vol. 139, No. 5, May 1992, pp. L45–L46.

\* cited by examiner

*Primary Examiner*—Patrick Ryan
*Assistant Examiner*—Julian Mercado
(74) *Attorney, Agent, or Firm*—Oliff & Berridge, PLC

(57) ABSTRACT

A fuel-cell electrode and a method of manufacturing the fuel-cell electrode achieves a high catalyst utilization ratio and makes it possible to obtain higher output characteristics with a smaller amount of catalyst. The fuel-cell electrode includes a catalytic layer composed of an ion conductive substance, an electron conductive substance and catalytic activation substances. The catalytic activation substances are electrolytically deposited on the electron conductive substance.

7 Claims, 5 Drawing Sheets

RELATED ART

FUEL-CELL ELECTRODE AND METHOD OF MANUFACTURING THE FUEL-CELL ELECTRODE

INCORPORATION BY REFERENCE

This is a Division of application Ser. No. 09/670,014 filed Sep. 26, 2000, now abandoned, which in turn claims the benefit of Japanese Patent Application No. JP Hei 11-297992 filed Oct. 20, 1999. The entire disclosure of the prior applications is hereby incorporated by reference herein in its entirety.

BACKGROUND OF THE INVENTION

1. Field of Invention

The invention relates to a fuel cell and a method of manufacturing the fuel cell. More specifically, the invention relates to an art for manufacturing a catalytic layer for an electrode which is in contact with an electrolyte in a fuel cell such as a polymer electrolyte fuel cell.

2. Description of Related Art

In general, a polymer electrolyte fuel cell is based on a structure of "an electrode-electrolyte conjugant" wherein an anode and a cathode are disposed on opposed surfaces of a polymer electrolyte. An electrode is usually composed of a catalytic layer and a gas diffusion layer and constructed such that the catalytic layer is in contact with the electrolyte.

In the thus-constructed fuel cell, when fuel gas (e.g. hydrogen) is supplied to the anode and oxidizer gas (oxygen gas) is supplied to the cathode, hydrogen ions generated in the anode move towards the cathode through the electrolyte and turn into water. By utilizing this electrochemical reaction, electric energy is taken out.

An electrode reaction for a fuel cell proceeds on an electrode catalyst. For example, in the case of a hydrogen-oxygen fuel cell, chemical reactions on the cathode side and the anode side can respectively be expressed as follows.

cathode side: 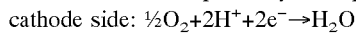½O$_2$+2H$^+$+2e$^-$→H$_2$O anode side: H$_2$→2H$^+$+2e$^-$ As is apparent from the aforementioned formulas, the electrode reaction requires movements of electrons and ions. Thus, in order for a catalytic electrode to function as "a reaction field", it is preferable that a catalytic activation substance be in contact with both an electron conductive substance and an ion conductive substance.

An electrode catalytic layer for a polymer electrolyte fuel cell is largely classified into the following three types.

<TYPE 1>

A carbon material (e.g. carbon black) is used as an electron conductive catalyst carrier. A catalytic activation substance such as platinum (Pt) is carried on the carbon material and mixed with an ion conductive substance (e.g. a polymer electrolyte).

<TYPE 2>

There is no catalyst carrier. Particles of a catalytic activation substance are mixed with an ion conductive substance.

<TYPE 3>

A layer of a catalytic activation substance such as Pt is directly provided on a surface of an electrolyte or a gas diffusion layer by means of plating or vaporization.

In TYPE 1 and TYPE 2, if occasion demands, a binder such as poly-tetra-fluoro-ethylene (PTFE) may further be included.

Among the aforementioned electrode catalytic layers, TYPE 1 is most commonly used because of the greatest specific surface area. As a rare case, it has also been reported that high outputs are achieved through combination of TYPE 1 and TYPE 3.

In a method of manufacturing a fuel-cell electrode having a catalytic layer of TYPE 1, a catalytic activation substance is first carried on an electron conductive substance to form a carrier-carrying catalyst. Then, the carrier-carrying catalyst is mixed with an ion conductive substance (if occasion demands, a binder is also added). Next, a layer of the mixture is formed on the surface of a gas diffusion layer or an electrolyte and finally bonded to a layer structure of the electrolyte/the catalytic layer/the gas diffusion layer.

In this case, the catalytic layer is not densely filled with the carrier-carrying catalyst and the ion conductive substance. The catalytic layer needs pores through which a gaseous reaction substance flows. Thus, the mixing ratio of the carrier-carrying catalyst and the ion conductive substance has a suitable range. However, within the range of the mixing ratio, it is difficult to cover all the surfaces of the carrier with the ion conductive substance.

Further, catalytic activation substances are homogeneously carried on the surface of the carrier. Therefore, as a matter of course, there are quite a few catalytic activation substances which are out of contact with the ion conductive substance. Even in the case where the catalytic activation substances are in contact with the ion conductive substance, if they are ion conductive substances separated from the electrolyte or if the carrier-carrying catalyst itself is separated from a network of electron conduction from the electrode to the terminal, they do not function as the electrode catalyst. Because of these reasons, the catalyst utilization ratio of the fuel-cell electrode having the catalytic layer of the structure of TYPE 1 is limited to approximately 20 to 70%.

Further, a fuel-cell electrode having the catalytic layer structure of TYPE 2 or TYPE 3 does not have a catalytic carrier. Therefore, the specific surface area (surface area per weight) of particles or layers of catalytic activation substances is small. Thus, a large quantity of catalyst is required to ensure a sufficient reaction area. For example, in the case of Pt catalyst, 2 mg or more of the catalyst is necessitated for an electrode area of 1 cm$^2$.

Further, if the catalytic structures of TYPE 1 and TYPE 3 are combined, i.e., in the case of a fuel-cell electrode wherein a Pt catalytic layer is formed on the surface of an electrolyte and a catalytic layer of TYPE 1 is formed on the Pt catalytic layer, the electric power generation capability can be enhanced to some extent. Nevertheless, a large amount of catalyst is used, so that the catalyst utilization ratio is not necessarily favorable.

SUMMARY OF THE INVENTION

It is an object of the invention to provide a fuel-cell electrode and a method of manufacturing the fuel-cell electrode which achieve a catalyst utilization ratio of 100% and which make it possible to obtain higher output characteristics with a smaller amount of catalyst by putting catalytic activation substances only on an interface between an ion conductive substance and an electron conductive substance capable of functioning electrochemically, instead of putting the catalytic activation substances on a surface of a carrier with which the ion conductive substance is out of contact or in a portion isolated in terms of ion conduction or electron conduction.

In order to achieve the above-stated object, the invention provides a fuel-cell electrode having an ion conductive substance, an electron conductive substance and catalytic activation substances, wherein substantially all the catalytic activation substances are in contact with both the ion conductive substance and the electron conductive substance.

In this construction, substantially all the catalytic activation substances are in contact with both the ion conductive substance and the electron conductive substance in the electrode catalytic layer. Thus, the catalytic activation substances can function as an electrode catalyst efficiently and effectively, whereby the catalyst utilization ratio is enhanced. This makes it possible to ensure higher output characteristics with a smaller amount of catalyst.

BRIEF DESCRIPTION OF THE DRAWINGS

The foregoing and further objects, features and advantages of the invention will become apparent from the following description of a preferred embodiment with reference to the accompanying drawings, wherein.

DETAILED DESCRIPTION OF PREFERRED EMBODIMENTS

Hereinafter, an embodiment of the invention will be described with reference to the drawings.

Figure 1:
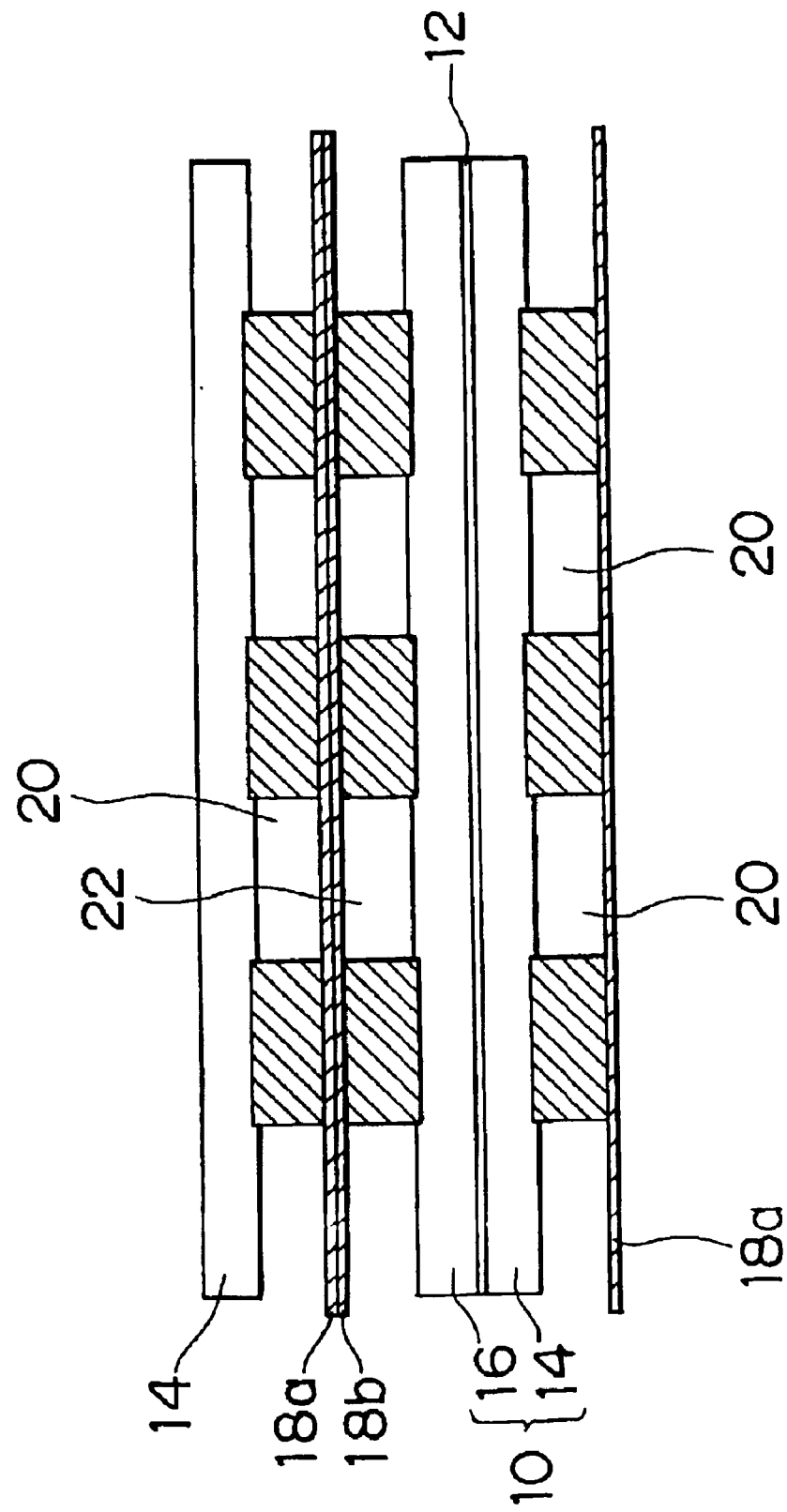
FIG. 1 is a schematic structural view of a polymer fuel cell in accordance with the invention.

FIG. 1 shows the structure of a fuel cell 10 of polymer electrolyte type in accordance with one embodiment of the invention. The fuel cell 10 has an anode 14 on one surface and a cathode 16 on the other surface. A polymer electrolyte 12 is sandwiched between the anode 14 and the cathode 16. The anode 14 and the cathode 16 have separators 18a, 18b respectively. A fuel gas flow passage 20 through which fuel gas (hydrogen and the like) flows is formed on the side of the anode 14. An oxidizer gas flow passage 22 through which oxidizer gas (air and the like) flows is formed on the side of the cathode 16. The fuel cell 10 is assembled in a laminated manner and used as a laminated fuel cell.

In this case, the polymer electrolyte 12 is made from an ion-exchange resin of perfluoro-sulfonic acid polymer known as a trade name of NAPHION (manufactured by DuPont Inc., registered trademark) or from an ion-exchange resin of styrene divinyl benzene sulfonic acid. The polymer electrolyte 12 preferably has a film thickness of 100 to 200 $\mu$m.

Figure 2:
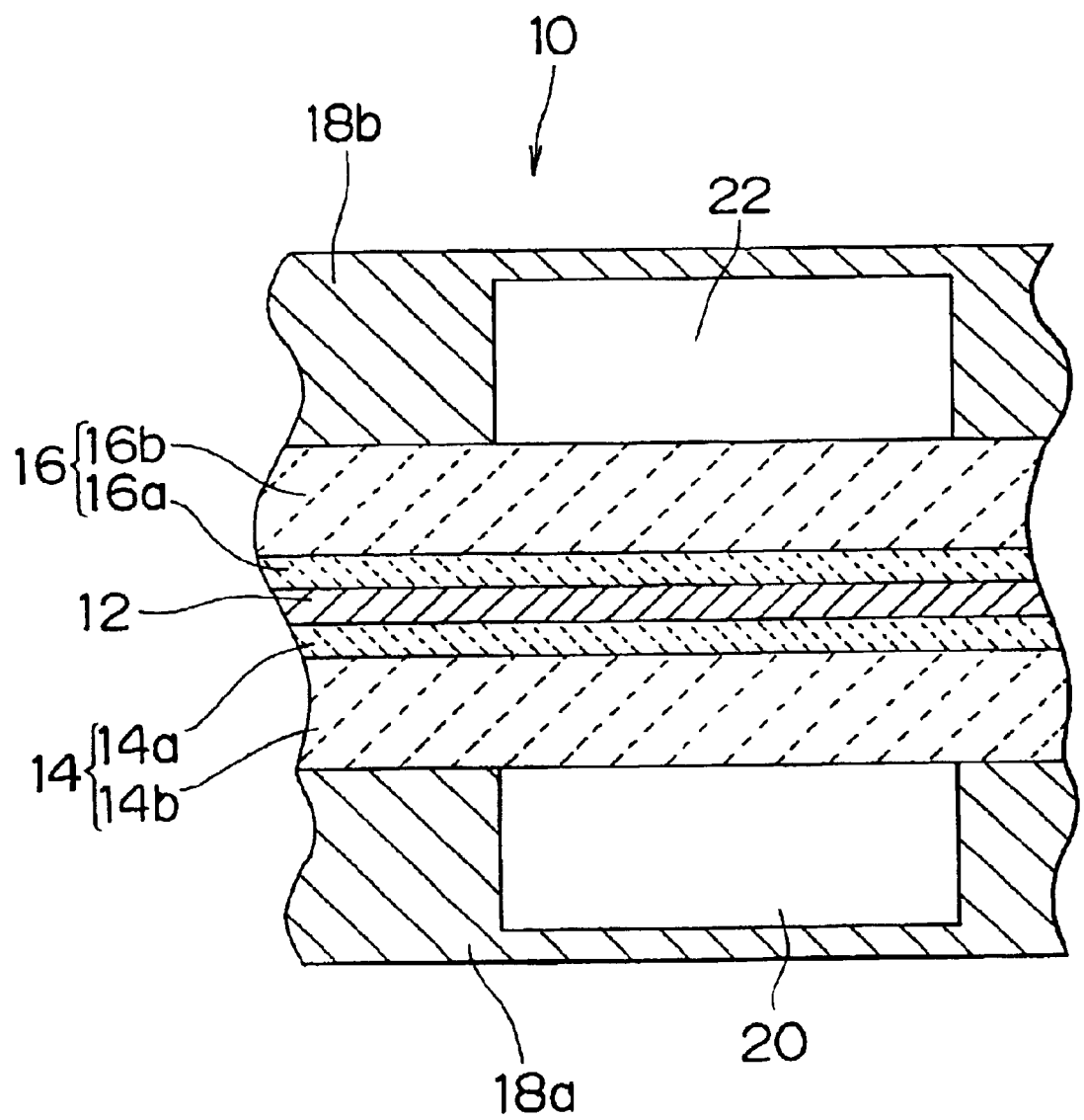
FIG. 2 is a cross-sectional structural view of electrodes (an anode and a cathode)

As shown in FIG. 2 in an enlarged manner, the anode 14 and the cathode 16 have catalytic layers 14a, 16a respectively for contact with the electrolyte 12, and gas diffusion layers 14b, 16b respectively for contact with the separators 18a, 18b respectively. The catalytic layers 14a, 14b are both a layer of an electrode catalyst (a catalytic activation substance) carried on carbon particles. The gas diffusion layers 16a, 16b are made from a porous material. As the catalytic activation substance, at least one substance is selected from noble metals such as Pt, Pd, Ru, Os, Ir, Rh and Au. The anode 14 and the cathode 16 are made, for example, from a material wherein diffusibility of reaction gas, generated gas and a substance such as water is compatible with conductivity of electrons. To be more specific, the anode 14 and the cathode 16 are made from a porous carbon-type material which is permeable to air and whose pores are homogeneously distributed, such as a sheet-like material made from carbon paper, carbon cloth or carbon powder mixed with a polymer binder such as polytetrafluorethylene. Furthermore, the separators are generally made from a dense graphite which has great current-collecting capability and which is stable even in the presence of oxidative water vapor.

Figure 3:
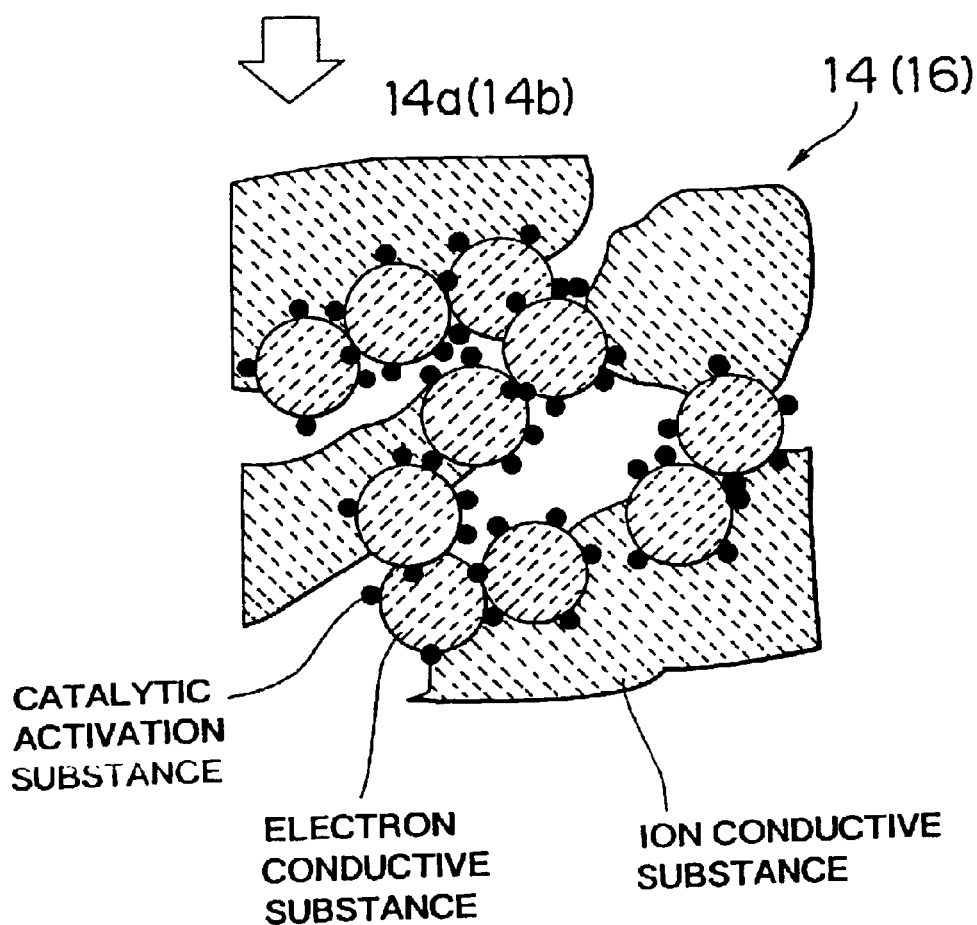
FIG. 3 is a model view of a cross-sectional structure of an electrode catalyst in accordance with the related art.

FIG. 3 is a model view of the cross-sectional structure of a generally known electrode catalytic layer. In this case, an electron conductive substance (e.g. a carbon material such carbon black) is dispersed in a polymer electrolyte material of NAPHION (manufactured by DuPont Inc., registered trademark), which is an ion conductive substance. Further, although a multitude of pores through which reaction gas flows are formed, a catalytic activation substance (e.g. Pt) carried on the electron conductive substance does not necessarily exist on a contact interface between the ion conductive substance and the electron conductive substance. That is, the catalytic activation substance also exists in a portion facing the pores of the electron conductive substance. Thus, the amount of the catalytic activation substance which is in contact with both the ion conductive substance and the electron conductive substance and which functions as a reaction field is limited. Hence, the utilization ratio of the catalyst is low.

Figure 4:
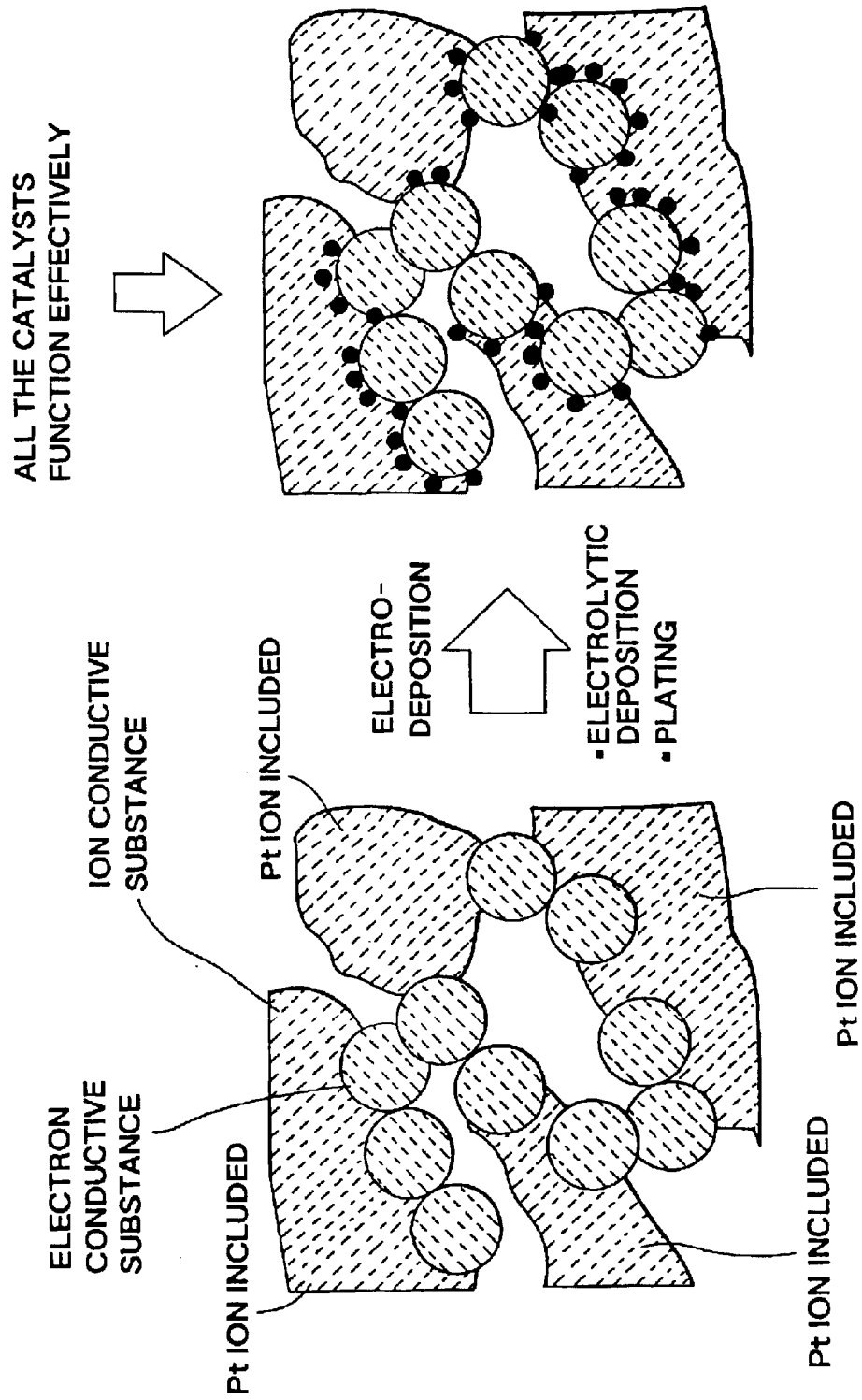
FIG. 4 is a model view of a cross-sectional structure of an electrode catalyst in accordance with the invention.

On the other hand, referring to FIG. 4 which shows the cross-sectional structure of an electrode catalytic layer in accordance with the invention, the catalytic activation substance is congested on the contact interface between carbon particles which are an ion conductive substance and NAPHION which is an electron conductive substance. The catalytic activation substance does not exist in the portion facing the pores of the electron conductive substance.

In forming the electrode catalytic layer shown in FIG. 4, the catalytic activation substance (Pt) is included in the ion conductive substance (NAPHION) in advance, and the electron conductive substance (carbon black) is interposed therein. By electrolytically reducing this mixture, the catalytic activation substance (Pt) included in the ion conductive substance is deposited. The electrolytic (electrochemical) reaction proceeds selectively only on the interface between the ion conductive substance and the electron conductive substance. Thus, the depositing reaction of the catalytic activation substance also proceeds exclusively on the interface between the ion conductive substance and the electron conductive substance. As a result, the deposited catalytic activation substance is in contact with both the ion conductive substance and the electron conductive substance.

As a concrete method of electrolytically depositing a catalytic component, the following two methods can be adopted. In one of the methods, current is caused to flow in the direction of reduction. In this case, the total amount of electricity to be supplied needs to be more than enough to reduce all the Pt salt included in the ion conductive substance in advance and deposit the metal Pt. It is preferable to cause more than five times as much as the required amount of electricity to flow. If the Pt salt is platinum chloride ($H_2PtCl_6$), it is at least necessary to cause a minimum amount of electricity $3.9 \times 10^5$ C/mol to flow. It is preferable to cause an amount of electricity $2 \times 10^6$ C/mol or more to flow.

In the other method, the electrode is maintained at a sufficiently low voltage. At least, this voltage needs to be lower than an oxidation voltage of a catalyst component metal (nonvalent) to be deposited. Preferably, electrolytic deposition is carried out at a voltage which is lower than the oxidation voltage by 500 mV or more.

Both the methods can be applied to the case where the later-described metal catalyst is nothing but Pt and the case where the metal catalyst is the mixture of Pt and Ru. As a matter of course, these methods can also be applied to a catalytic metal other than those metals.

Hereinafter, characteristics of electrodes for a fuel cell (Sample-1A and Sample-1B) manufactured according to the invention and comparison examples (Sample-1B and Sample-2B) will be described.

First of all, measured amounts of materials shown in TABLES 1 through 4 were prepared and mixed well into a paste. These mixtures were homogeneously applied to the surface of a diffusion layer of carbon cloth of the size 10 cm×10 cm and air-dried so as to fabricate electrodes (an anode and a cathode). These electrodes were bonded to both surfaces of a NAPHION 112 film (approximately 50 μm in thickness when dried) through hot pressing. Then, a single fuel cell was formed by means of an electrode-electrolyte conjugant.

TABLE 1

Sample-1A

| | Material | amount |
|---|---|---|
| anode | dried carbon black | 80 mg |
| | alcoholic solution of NAPHION (polymer content 5 wt %, aldorich) | polymer weight equivalent to 40 mg |
| | Ammine complex salt of Pt | Pt content equivalent to 20 mg |
| cathode | same as above | same as above |

TABLE 2

Sample-1B (comparison example)

| | material | amount |
|---|---|---|
| anode | Pt-carrying carbon (20 wt % of Pt is carried on carbon black) | 100 mg |
| | Alcoholic solution of NAPHION (polymer content 5 wt %, aldorich) | polymer weight equivalent to 40 mg |
| cathode | same as above | same as above |

TABLE 3

Sample-2A

| | material | amount |
|---|---|---|
| anode | dried carbon black | 80 mg |
| | alcoholic solution of NAPHION (polymer content 5 wt %, aldorich) | polymer weight equivalent to 40 mg |
| | platinum chloride | Pt content equivalent to 13.3 mg |
| | ruthenium chloride | Ru content equivalent to 6.7 mg |
| cathode | same as Sample-1A | same as Sample-1A |

TABLE 4

Sample-2B (comparison example)

| | material | amount |
|---|---|---|
| anode | Pt-Ru-carrying carbon (13.3 wt % of Pt and 6.7 wt % of Ru are carried on carbon black) | 100 mg |
| | alcoholic solution of NAPHION (polymer 5 wt %, aldorich) | polymer weight equivalent to 40 mg |
| cathode | same as Sample-1B | same as Sample-1B |

For the single fuel cells in Sample-1A and Sample-1B, electric current of 10A was alternately supplied to both the poles for 5 minutes respectively (10 times) while causing nitrogen gas to flow through a bipolar gas flow passage. Then, the Pt-salt included in a bipolar catalytic layer was electrochemically reduced and deposited on the carbon black.

Comparison of the respective examples reveals that Pt (and Ru), which is a catalytic activation substance, is deposited on the interface between carbon black and NAPHION in Sample-1A and Sample-2A. That is, as shown in FIG. 4, substantially all the catalytic activation substances are in contact with both carbon black and NAPHION. On the other hand, in Sample-1B and Sample-2B, the catalytic activation substance is carried on carbon black and then mixed with NAPHION. Thus, as shown in FIG. 3, the catalytic activation substance exists not only on the interface between carbon black and NAPHION but also in the portion facing the pores of carbon black.

Figure 5:
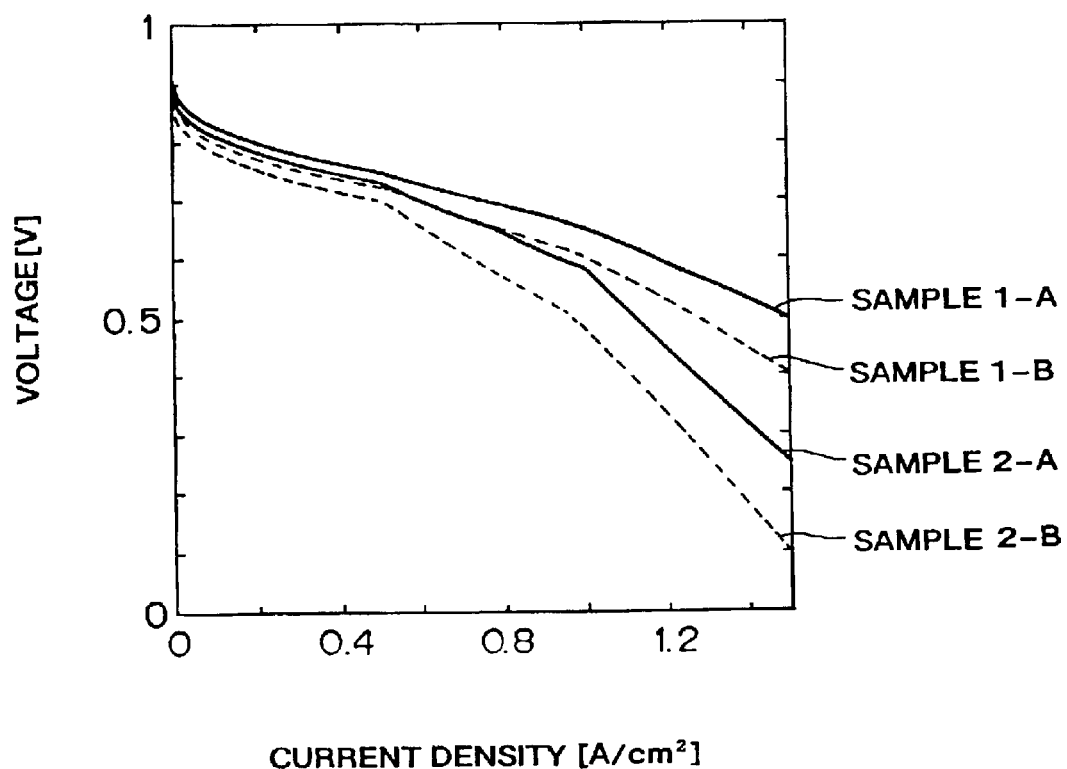
FIG. 5 is a graph showing a relation between discharge currents and voltages in the fuel cell.

FIG. 5 is a graph showing a relation between discharge currents and voltages in the case where a charge-and-discharge test has been conducted for fuel cells employing the respective electrode catalysts.

During measurement, the following gases were supplied to the respective electrode catalysts.
[Sample-1A and Sample-1B]
  cathode: air (2ata)
  anode: pure hydrogen (2ata)
[Sample-2A and Sample-2B]
  cathode: air (2ata)
  anode: hydrogen containing 50 ppm of CO (2ata)

As shown in FIG. 5, for the battery characteristics of the electrode catalysts, Sample-1A and Sample-2A, that have been manufactured according to the invention, higher outputs can be obtained in comparison with Sample-1B and Sample-2B. In other words, the catalyst utilization ratio is high in the electrode catalysts Sample-1A and Sample-2A. This is considered to be the cause of an improvement in the battery characteristics.

The invention is not limited to the aforementioned embodiment, and various modifications are possible within the scope of the invention. For example, a polystyrene-type material may be used as the polymer electrolyte or the ion conductive substance. Further, among noble metals such as Pt, Pd, Ru, Os, Ir, Rh and Au, one or two or more substances may be used as the catalytic activation substance. The condition for electrolytically depositing the electrode catalytic layer can be changed depending on the metallic salt used (e.g. ammine complex salt of Pt, ruthenium chloride).

According to the fuel-cell electrode of the invention that has been described hitherto, substantially all the catalytic activation substances are in contact with both the ion conductive substance and the electron conductive substance in the electrode catalytic layer. Thus, the catalytic activation substances can function as an electrode catalyst efficiently and effectively, whereby the catalyst utilization ratio is enhanced. This makes it possible to ensure high output characteristics with a small amount of catalyst.

Further, according to the method of manufacturing the fuel cell of the invention, the catalytic activation substances are deposited on the electron conductor through an electrochemical (electrolytic) reaction. Therefore, the catalytic activation substances are formed exclusively on the interface between the electron conductor and the ion conductor. This makes it possible to efficiently and easily obtain a fuel cell with a high catalyst utilization ratio wherein all the catalytic activation substances are in contact with both the ion conductor and the electron conductor.

Thus, application of the invention to a fuel cell to be installed in a motor vehicle not only achieves duration of high electric generating power but also a reduction in usage of expensive catalysts. Thus, the cost for the fuel cell can be reduced to the extent of increasing economic benefits.

What is claimed is:

1. A method of manufacturing a fuel-cell electrode comprising:

including a precursor of catalytic activation substances in an ion conductive substance;

mixing the ion conductive substance including the precursor of the catalytic activation substances and an electron conductive substance;

drying the mixture; and electrodepositing the catalytic activation substances from the precursor of the catalytic activation substances included in the ion conductive substance on the electron conductive substance at interfaces between the electron conductive substance and the ion conductive substance by electrodeposition by a negative potential of the dried mixture.

2. The method according to claim 1, wherein:

the ion conductive substance is a polymer electrolyte.

3. The method according to claim 1, wherein:

the electron conductive substance is carbon powder.

4. The method according to claim 1, wherein:

the catalytic activation substances include at least one noble metal.

5. The method according to claim 1, wherein:

the ion conductive substance is a polymer electrolyte.

6. The method according to claim 1, wherein:

the electron conductive substance is carbon powder.

7. The method according to claim 1, wherein:

the catalytic activation substances include at least one noble metal.

* * * * *